(12) United States Patent
Roth

(10) Patent No.: US 12,716,437 B1
(45) **Date of Patent: *Aug. 25, 2026**

(54) BREAKAWAY HANGER AND METHOD OF ATTACHING A BREAKAWAY HANGER TO METAL DECKING

(71) Applicant: Steven Andrew Roth, Alamo, CA (US)

(72) Inventor: Steven Andrew Roth, Alamo, CA (US)

( * ) Notice: Subject to any disclaimer, the term of this patent is extended or adjusted under 35 U.S.C. 154(b) by 110 days.

This patent is subject to a terminal disclaimer.

(21) Appl. No.: 18/756,275

(22) Filed: Jun. 27, 2024

Related U.S. Application Data

(63) Continuation-in-part of application No. 17/323,890, filed on May 18, 2021, now Pat. No. 12,031,563, which is a continuation-in-part of application No. 16/178,514, filed on Nov. 1, 2018, now abandoned.

(60) Provisional application No. 62/580,829, filed on Nov. 2, 2017.

(51) Int. Cl.
*F16B 2/06* (2006.01)
*F16B 31/02* (2006.01)
*F16M 13/02* (2006.01)

(52) U.S. Cl.
CPC ............ *F16B 2/065* (2013.01); *F16B 31/021* (2013.01); *F16M 13/02* (2013.01)

(58) Field of Classification Search
CPC ............... F16L 3/12; F16B 2/065; E04B 9/00
USPC ........ 248/58, 59, 60, 61, 62, 63, 72, 70, 73, 248/74.1, 74.4, 228.6; 52/39, 27
See application file for complete search history.

(56) References Cited

U.S. PATENT DOCUMENTS

| | | | | | | |
|---|---|---|---|---|---|---|
| 497,679 | A | * | 5/1893 | Newbury | F16L 3/24 | 248/72 |
| 948,902 | A | * | 2/1910 | Noyles | F16L 3/14 | 248/62 |
| 1,646,244 | A | * | 10/1927 | Hassler | B65G 9/008 | 104/111 |
| 1,670,902 | A | * | 5/1928 | Popps | F16L 3/24 | 248/72 |
| 1,832,315 | A | * | 11/1931 | Mcnulty | F16L 3/24 | 248/62 |
| 2,470,992 | A | * | 5/1949 | Kindorf | F16L 3/24 | 248/72 |
| 3,415,471 | A | * | 12/1968 | Matson | F16M 1/00 | 248/228.1 |
| 3,445,081 | A | * | 5/1969 | Roussos | F16L 3/24 | 248/228.6 |
| 4,238,098 | A | * | 12/1980 | Siegfried | F16L 3/24 | 248/228.7 |
| 4,666,116 | A | * | 5/1987 | Lloyd | F16B 2/065 | D8/394 |

(Continued)

*Primary Examiner* — Terrell L Mckinnon
*Assistant Examiner* — Michael McDuffie
(74) *Attorney, Agent, or Firm* — Dickinson Wright PLLC

(57) ABSTRACT

A hanger and method of a hanger to a metal decking are described. The metal decking includes a bottom flange and a pair of webs each having a groove. The hanger is side to generally conform to the shape of the bottom flange and a the webs and includes at least two set bolts that engage the pair of grooves. One of the set bolts is designed do deform when a load exceeds a predetermined load, such that the hanger disengages from the metal decking to prevent seismic damage The method includes positioning the hanger against a bottom flange of the metal decking and advancing two or more set bolts from the hanger into the grooves.

19 Claims, 6 Drawing Sheets

(56) References Cited

U.S. PATENT DOCUMENTS 4,802,422 A * 2/1989 Beard ........................ F16B 2/10 403/387
5,423,507 A * 6/1995 Florent ..................... E04B 9/18 52/39
5,713,157 A * 2/1998 van Leeuwen ........... E04B 9/18 52/39
6,012,691 A * 1/2000 van Leeuwen ........ H02G 3/263 248/62
6,058,859 A * 5/2000 Colosimo, Jr. ......... F27D 1/021 432/252
6,334,285 B1 * 1/2002 Kirschner ............... F16L 55/18 249/23
7,162,837 B1 * 1/2007 Roth ....................... F16L 3/245 52/698
7,603,814 B1 * 10/2009 Hartmann ................. G09F 7/18 52/27
8,061,096 B2 * 11/2011 Kim .......................... E04C 3/32 52/223.14
8,061,672 B1 * 11/2011 Kaufman .................. E04B 2/82 248/228.3
8,608,417 B2 * 12/2013 Pratt ..................... F16B 13/063 411/42
8,931,747 B2 * 1/2015 Davis ..................... F16M 13/02 248/228.3
9,004,835 B2 * 4/2015 Dayton ................... E04B 1/185 411/386
9,353,878 B2 * 5/2016 Plummer ............... A62C 35/68
9,677,585 B2 * 6/2017 Broussard ............. F16B 7/0493
9,850,659 B2 * 12/2017 Roth ....................... F16B 2/065
10,069,455 B2 * 9/2018 Corio .................... F24S 25/634
10,612,573 B2 * 4/2020 Recker ...................... F16B 2/12
11,047,408 B2 * 6/2021 Roman ................... F16B 2/065
11,333,179 B2 * 5/2022 Haddock ................. F24S 25/63
11,598,092 B1 * 3/2023 Roth ....................... F16B 7/187
12,031,563 B1 * 7/2024 Roth ....................... F16B 2/065
2005/0258315 A1 * 11/2005 Bigham .................. F16L 3/137 248/74.3
2006/0272889 A1 * 12/2006 Paquette ............. E04G 21/3276 182/3
2007/0138361 A1 * 6/2007 Poce ................... E04H 12/2261 248/228.6
2007/0243037 A1 * 10/2007 Pratt ................... F16B 13/0858 411/43
2009/0183462 A1 * 7/2009 Osborn ................... F16B 2/065 52/745.21
2023/0323912 A1 * 10/2023 York, III ............... F16B 35/045 411/2

* cited by examiner 400
401
402
416
418
404
403
405
T1
H1
S1
312
421
423
425
314

400
L1
406
408
407
409
W1
D1
312
403
402
404
405

400
314
403
405
407
409
421
423
425

BREAKAWAY HANGER AND METHOD OF ATTACHING A BREAKAWAY HANGER TO METAL DECKING

CROSS-REFERENCE TO RELATED APPLICATIONS

This application is a continuation-in-part of U.S. patent application Ser. No. 17/323,890, filed May 18, 2021, which is a continuation-in-part of U.S. patent application Ser. No. 16/178,514, filed Nov. 1, 2018, which claims the benefit of U.S. Provisional Application No. 62/580,829, filed Nov. 2, 2017, the contents of which are hereby incorporated by reference in its entirety.

BACKGROUND OF THE INVENTION

Field of the Invention

The present invention relates to a method for building construction industry, and more particularly to a breakaway hanger and method for attaching a breakaway hanger to the underside of an overhead metal deck.

Discussion of the Background

It is standard practice in the construction of commercial buildings to use corrugated metal decking as the floor of each story of a building. It is also common practice to suspend items below the decking for the purpose of connecting to suspended utility loads, such as service elements, including conduits, pipes, ducting, systems, and the like.

FIGS. 1 and 2 are a bottom and sectional view 2-2 of a prior art metal decking 10 and a prior art hanger 1. Metal decking 10 is typically formed from one or more metal sheets of 16-22 gauge formed into a corrugated structure and which may include concrete on one side of the metal. Thus, for example, FIG. 1 shows metal decking 10 as having a width W and a length L and including a number of features that extend the length of the decking.

Metal decking 10 is shown as having a plurality of generally horizontal top flanges 13 with width WU, a plurality of generally horizontal bottom flanges 15 a distance D from the top flanges and having a width WL, and webs 16 and 17 that connect adjacent top and bottom flanges. Metal decking 10 is shown as including optional concrete 12 which is poured over the top of the metal decking.

Metal decking 10 may be considered to include a plurality of troughs 14 and flutes 11. Each trough 14 includes one top flange and the webs adjacent to that top flange, and each flute 11 includes one bottom flange 15 and the webs adjacent to that bottom flange. Flanges 13 and 15 and webs 16 and 17 are generally planar. In certain embodiments, flanges 13 and 15 and webs 16 and 17 may include indentations, vent holes, undulations, corrugations, or grooves. FIG. 2 shows, for example, that web 16 includes groove 18 and that web 17 includes groove 19, where the grooves extend along the length L of metal decking 10. In general, grooves 18 and 19 extend along length L and are parallel at a distance H from bottom flange 15. The spacing of the grooves on either side of a flute is WG.

Examples of metal decking 10 include, but are not limited to, VERCO (VERCO DECKING, INC., Phoenix, AZ) models PLW2, W2 FORMLOK™, where D=2 1/16 ", WL=WU=5", WT=7", WG=6", and H=1", or models PLW3, or W3 FORMLOK™, where D=3", WL=WU=4.5", WT=7.5", WG=5 1/4 ", and H=7/8 ".

It is a typical commercial building construction practice to attach hangers to the underside of overhead metal decking filled with hardened concrete by drilling a hole through the metal decking and hardened concrete and installing a concrete anchor into the hole in the concrete. FIG. 2 shows a prior art hanger 1, which includes a concrete anchor 3 supported by concrete 12, and a load support 2 attached to the concrete anchor 3.

While prior art hangers are widely used for metal decking, there are several problems associated with such hangers. First, attaching the hangers involves drilling through two types of material-metal and concrete. This type of operation is noisy and can cause vibrations of the deck structure. While this may not be an issue for new construction, it can be problematic for retrofitting structures, where tenants may be occupying the building.

In addition, drilling or otherwise opening a hole in concrete fractures the concrete and reduces the strength of the concrete for some distance in the concrete. Thus, one may have to space the anchors sufficiently far apart to provide sufficient structural support for the anchors.

A second problem is that under certain circumstances the hanger may damage the supporting metal decking. In general, metal decking is capable of supporting only a maximum load without damaging the metal decking. Unexpected movement of the earth or building in the event of an earthquake, explosion, impact or other types of events can greatly increase the load on the hanger and may cause structural damage to the supporting structure or to the building. Any such event is referred to herein, and without limitation, as an "excessive load event." When any of these occur, the load supported by the metal decking using a hanger may increase to the point where there is a failure of the metal decking. Thus, for example, the up and down ground motion during a seismic event can result in a rapidly varying load, which is transferred to the supporting concrete. This load increase can cause the concrete to fail near the location of the anchor. Due to the large number of anchors in a building, the building structure may be threatened.

There is a need in the art for a hanger and method of hanging loads that is easier to attach to a metal decking. Such a device and method should be able to support sufficient weight to permit the hanging of conduits, should be easy to attach to the underside of metal decking, without drilling into the decking or any concrete, should involve reduced noise and vibration over prior art techniques, and should be removable.

There is also a need in the art for a breakaway hanger and method of attaching a breakaway hanger to a metal decking to prevent damage to the metal decking or building from damage due to an excessive load event. Such a method and apparatus should be easy to use, be compatible with current construction techniques, should provide for retro-fitting of existing installations and should be inexpensive.

In certain embodiments, hangers and methods should also be usable for metal decking that does not include concrete reinforcement.

BRIEF SUMMARY OF THE INVENTION

The present invention overcomes the disadvantages of prior art metal decking hangers and methods of hanging conduits from metal decking. In one embodiment, a hanger is placed horizontally across the ridges of a corrugated metal deck.

Certain embodiments provide a hanger for attaching to an underside of a metal decking and supporting a load less than a predetermined load F*. The metal decking includes a bottom flange having a width, a first web extending away from the bottom flange having a first groove, and a second web extending away from the bottom flange and having a second groove, where the first groove and the second groove are parallel with a spacing of WG and with a distance H from the bottom flange. The hanger includes a body, a first set bolt, and a second set bolt. The body incudes a first end, a second end, and a central portion between the first end to the second end, where the central portion includes a top surface having a length defining a top plane and a bottom surface, where the first end and the second end extend away from the top plane, where the first end includes a first threaded hole at an angle θ relative to the top surface, and where the second end includes a second threaded hole at the angle θ relative to the top surface. The first set bolt is threadably engaged with the first threaded hole such that the first set bolt forms the angle θ relative to the top surface with a tip of the first set bolt pointing towards the top surface. The second set bolt is threadably engaged with the second threaded hole such that the second set bolt forms the angle θ relative to the top surface with a tip of the second set bolt pointing towards the top surface. When the top surface is placed adjacent to the bottom flange with the first end adjacent to the first web and the second end adjacent to the second end, the tip of the first set bolt contacts the first groove and the tip of the second set bolt contacts the second groove. When the hanger is engaged with the metal decking with the tip of the first set bolt within the first groove and with the tip of the second set bolt within the second groove, and when the load supported by the hanger increases above the predetermined load F*, the hanger disengages from the metal decking.

Certain other embodiments provide a method of attaching a hanger to an underside of a metal decking and supporting a load less than a predetermined load F*. The metal decking includes a bottom flange having a width, a first web extending away from the bottom flange having a first groove, and a second web extending away from the bottom flange and having a second groove, where the first groove and second groove are parallel with a spacing of and with a distance H from the bottom flange. The hanger includes a body, a first set bolt, and a second set bolt. The body includes a first end, a second end, and a central portion between the first end to the second end, where the central portion includes a top surface having a length defining a top plane and a bottom surface, where the first end and the second end extend away from the top plane, where the first end includes a first threaded hole at an angle θ relative to the top surface, and where the second end includes a second threaded hole at the angle θ relative to the top surface, a first set bolt threadably engaged with the first threaded hole such that the first set bolt forms the angle θ relative to the top surface with a tip of the first set bolt pointing towards the top surface, and a second set bolt threadably engaged with the second threaded hole such that the second set bolt forms the angle θ relative to the top surface with a tip of the second set bolt pointing towards the top surface. The method includes: positioning the body adjacent to the metal decking with the top surface adjacent to the bottom flange, with the first threaded hole adjacent to the first groove, and with the second threaded hole adjacent to the second groove; advancing an end of the first set bolt through the first threaded hole to contact the first groove; and advancing an end of the second set bolt through the second threaded hole to contact the first groove. When the load supported by the hanger increases above the predetermined load F*, the hanger disengages from the metal decking.

These features together with the various ancillary provisions and features which will become apparent to those skilled in the art from the following detailed description, are attained by the hanger and methods of attaching a hanger to a metal decking of the present invention, embodiments thereof being shown with reference to the accompanying drawings, by way of example only, wherein:

Reference symbols are used in the Figures to indicate certain components, aspects or features shown therein, with reference symbols common to more than one Figure indicating like components, aspects or features shown therein.

DETAILED DESCRIPTION OF THE INVENTION

Various embodiments provide a breakaway hanger (or, without limitation, a "hanger") that may be attached to one or more flutes of a metal decking. More specifically, the breakaway hanger may be installed into the underside of overhead metal deck, which may or may not have a concrete fill. The breakaway hanger is for use at a point of overhead attachment of material to members that extends downward, for the purpose of connecting to suspended utility loads, such as service elements, including conduits, pipes, ducting, systems, and the like. As described subsequently, the breakaway hanger engages with a metal decking and, when supporting a load during an excessive load event, will disengage from the metal decking before the hanger damages the metal decking.

Figure 1:
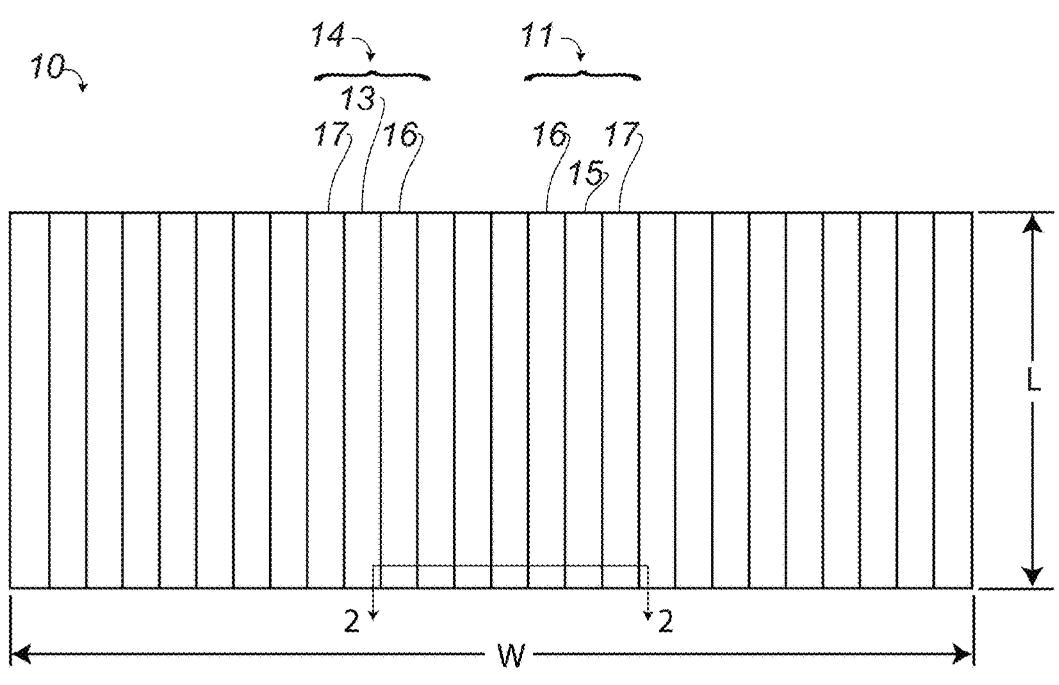
FIG. 1 is a bottom view of prior art metal decking.
Figure 2:
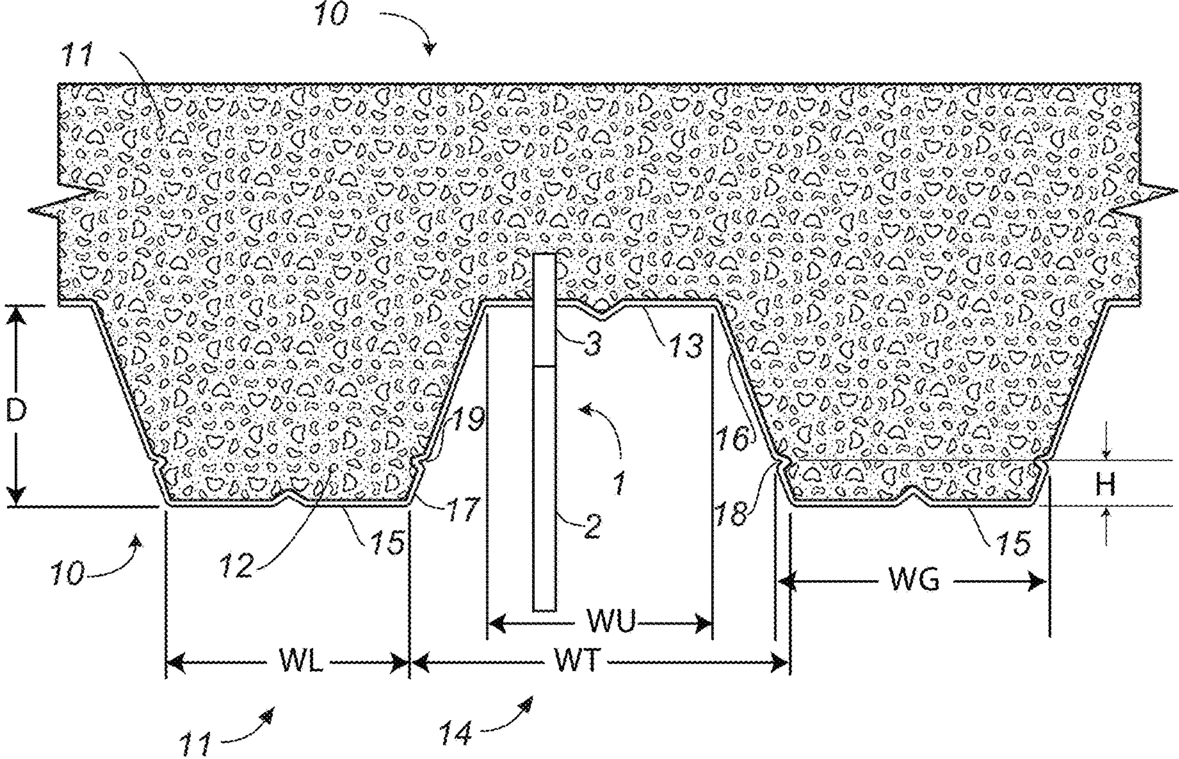
FIG. 2 is a sectional view 2-2 of FIG. 1, illustrating a prior art hanger attached to the underside of a prior art metal decking.
Figures 3A, 3B, 3C, 3D:
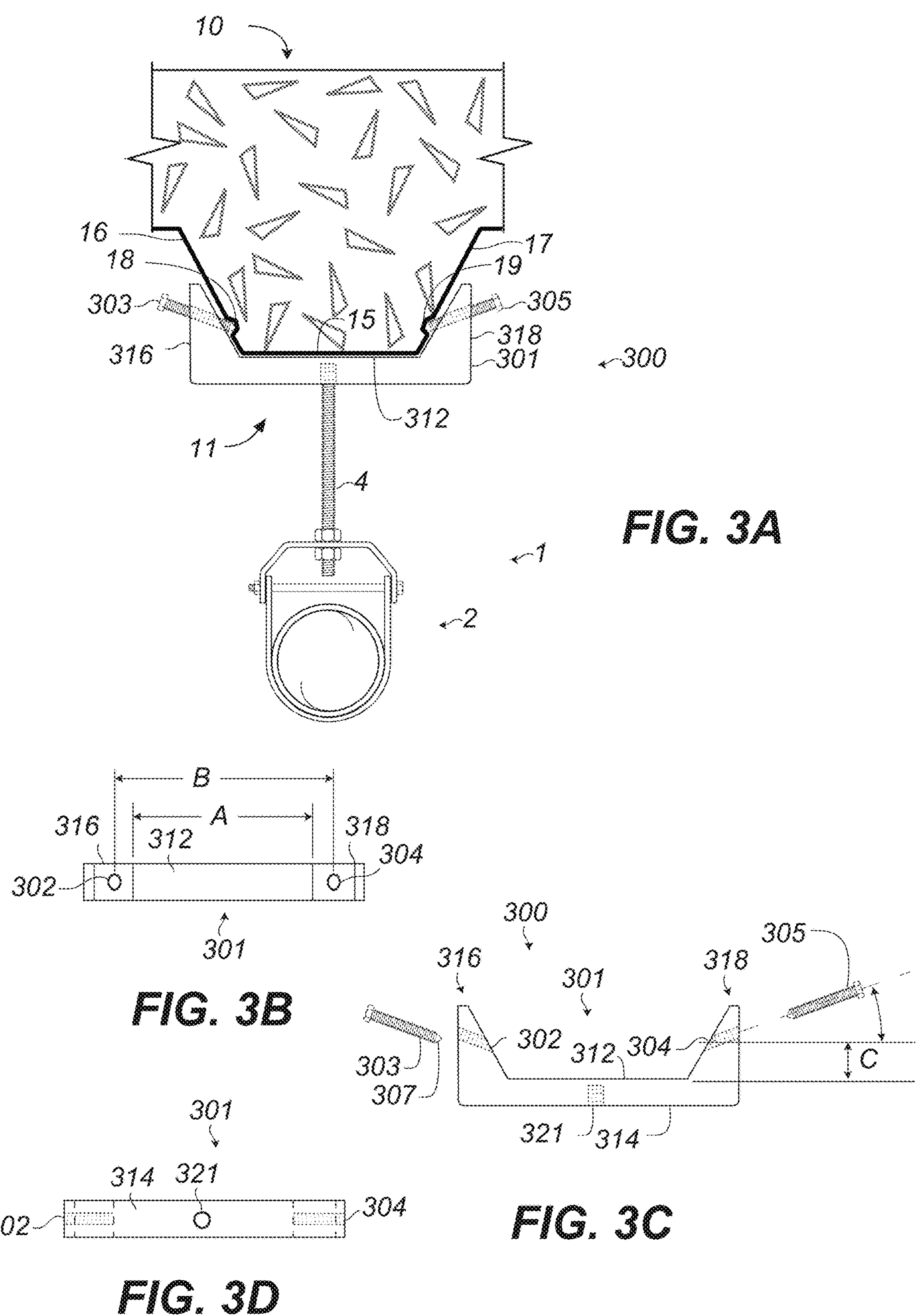
FIG. 3A is a side view of a first breakaway hanger embodiment installed on a metal decking of FIG. 2.
FIGS. 3B, 3C, and 3D are a top view, side view, and bottom view, respectively, of components of a first breakaway hanger embodiment.

FIG. 3A is a side view of a first breakaway hanger embodiment 300 on a metal decking 10, and FIGS. 3B, 3C, and 3D are a top view, side view, and bottom view, respectively, of components of the first hanger embodiment.

Breakaway hanger 300 includes a body 301 and a pair of set bolts shown as a first set bolt 303 and second set bolt 305. Body 301 includes a generally planar top surface 312, a generally planar bottom surface 314, a first side 316 having a first threaded through hole 302 that accepts first set bolt 303, and a second side 318 having a second threaded hole 304 that accepts second set bolt 305. The ends of set bolts 303 and 305 are tips that may be conical or have some other shape that ends in a point, which is shown, for example as tip 307. As shown in FIG. 3C, holes 302 and 304 are angled at an angle θ to top surface 312 such that the set bolts 303 and 305 are angled towards the top surface, with the tips of the set bolts facing the top surface. Body 301 is formed of metal, such as steel, and is sized to act as a hanger and to support loads, as is known in the art.

In certain embodiments, θ is greater than 0 degrees. In one embodiment, θ is between 0 degrees and 45 degrees. In another embodiment, θ is between 20 degrees and 40 degrees. In yet another embodiment, θ is between 25 degrees and 35 degrees. In a certain embodiment, θ is 30 degrees.

Body 301 also includes a threaded hole 321 at least partially through bottom surface 314 which may be used to support a prior art hanger 1, which is shown for illustrative purposes as including load support 2 and a threaded rod 4.

In certain embodiments, the shape of breakaway hanger 300 permit top surface 312 to be placed adjacent to bottom flange 15 of metal decking 10 and with the tips of set bolts 303/305 adjacent to grooves 18/19. Thus, for example, a length, A, of bottom surface 314 is sized to be larger than width WL, a length B between the inner ends of holes 302 and 304 that is greater than WG, and a height C between the inner ends of holes 302 and 304 and top surface 312 that is greater that height H. This shape permits the tips of set bolts 303 and 305 to fit within grooves 18 and 19. Thus for example, for metal decking 10 formed from VERCO (VERCO DECKING, INC., Phoenix, AZ) models PLW3, or W3 FORMLOK™, where D=3", WL=WU=4.5", WT=7.5", WG=5¼ ", and H=⅞ ", A may be, for example and without limitation, be more or less than the length WU, such as from 4" to 4.5", B is greater than the spacing WG, and may be, for example and without limitation, from 5¼ " to 5¾ ", and C=is approximately 1". In certain embodiments, threaded hole 321 are ⅜ "-16, ½ "-13, or ⅝ "-11.

Breakaway hanger 300 may be attached to metal decking 10 as follows. Breakaway hanger 300 may be attached to one flute 11 of metal decking 10 by placing top surface 312 of the hanger adjacent to bottom flange 15 with hanger first side 316 adjacent to web 16 and second 318 adjacent to web 17. Set bolt 303 is then tightened into threaded hole 302 such that the tip protrudes into groove 18 and set bolt 305 is tightened into threaded hole 304 such that the tip protrudes into groove 19. In certain embodiments, it is only the set bolt tips, and not body 301, which contacts metal decking 10. Due to the angling of holes 302 and 304 the tightening of set bolts 303 and/or 305 causes body 301 to be pulled up towards bottom flange 15. Set bolts 303 and 305 may be tightened, for example and without limitation, to a minimum torque of 10 ft-lb.

Breakaway hanger 300 may be used to support a load from the underside of metal decking 10. Thus, for example, FIG. 3A illustrates threaded rod 4 supported by threaded hole 321.

In one embodiment, breakaway hanger 300 may be removed from metal decking 10 by untightening one or both of set bolts 303 and/or 305. In an alternative embodiment, set bolts 303 and/or 305 have torque-off heads and thus cannot be loosened after they are tightened. The torque required for breaking off the set bolt heads are such that breakaway hanger 300 is fastened to metal decking 10. In certain embodiments, the torque required to torque-off the heads of set bolts 303 and 305 is a minimum of 10 ft-lb.

During an excessive load event, the vertical motion of breakaway hanger 300 results in an increase of the load transferred to metal decking 10. Thus, for example, breakaway hanger 300 may support a static load, F, and during a seismic event the load will vary from a value $F_{min}$, which is less than F, to a value $F_{max}$, which is greater than F. If $F_{max}$ is too large, the hanger may damage the metal decking. To prevent such damage, breakaway hanger 300 is designed to disengage from metal decking 10 when the load exceeds a predetermined load, F*.

In various embodiments, breakaway hanger 300 is designed to disengage from metal decking 10 by choosing one or both of set bolt 302 and set bolt 305 that will fail, such as by a ductile failure, when a supported load exceeds a value of F*. As a result, the tips of the set bolts no longer fitting into grooves 18 and 19 and the hanger falls away from the metal decking. The selection of set bolts and the operation of the breakaway hanger is discussed subsequently.

Figures 4A, 4B, 4C:
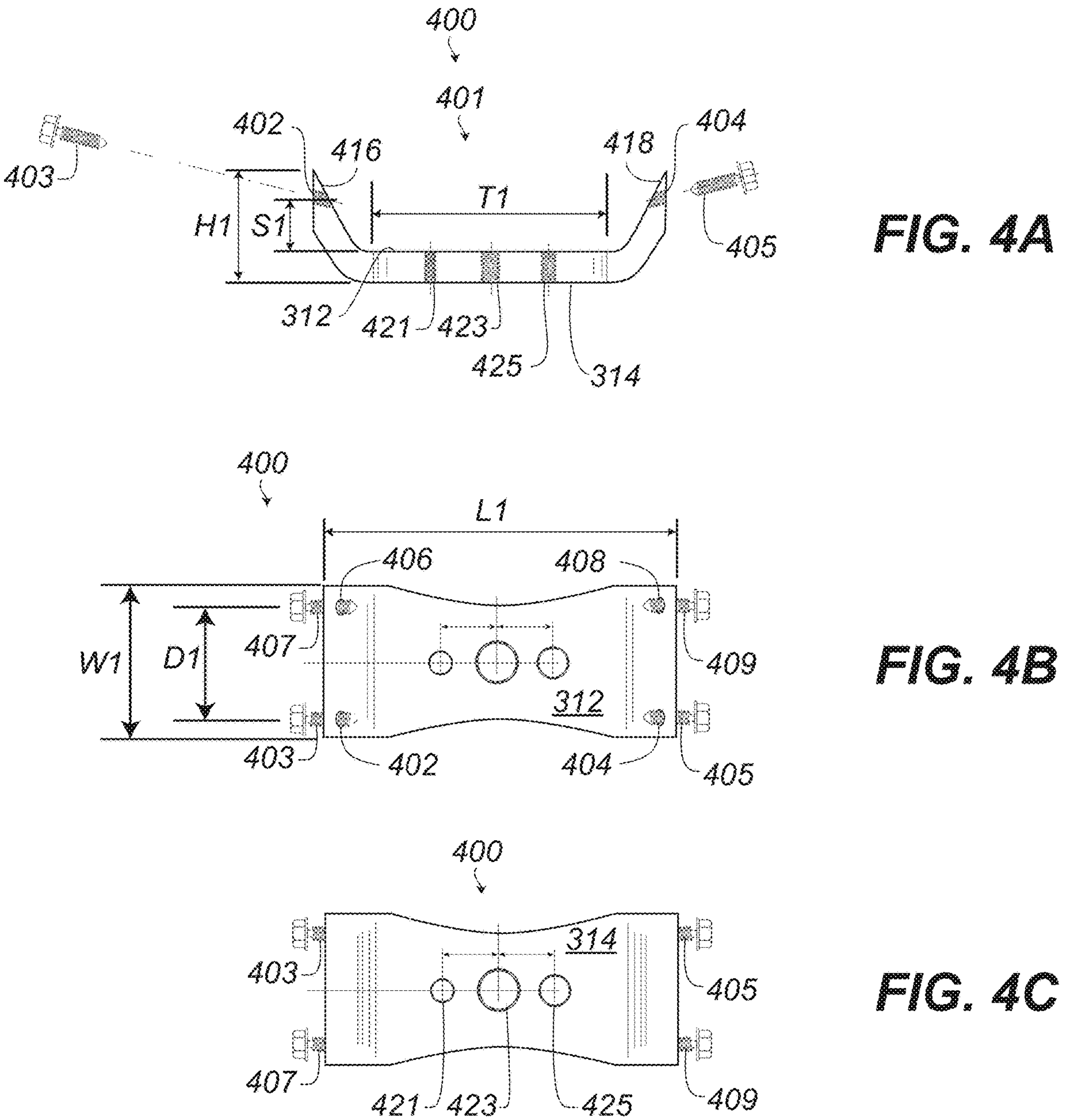
FIGS. 4A, 4B, and 4C are a side view, top view, and bottom view, respectively, of components of a second breakaway hanger embodiment.

FIGS. 4A, 4B, and 4C are a side view, top view, and bottom view, respectively, of components of a second breakaway hanger embodiment 400 which includes a hanger body 401 and four set bolts shown set bolts 403, 405, 407, and 409. Hanger 400 is generally similar to breakaway hanger 300 and differs in that it includes four set bolts. Breakaway hanger 400 is otherwise generally similar to breakaway hanger 300, except as explicitly stated below.

Body 401 includes a first side 416 having a first threaded through hole 402 that accepts set bolt 403 and a second threaded through hole 406 that accepts set bolt 407, and a second side 418 having a second threaded through hole 404 that accepts set bolt 405 and fourth treaded through hole 408 that accepts set bolt 409. Trough holes 402 and 404 are in a first plane aligned with the length of body 401 and through holes 406 and 408 are in a second plane parallel with and separated from the first plane by a distance E. Holes 402, 404, 406, and 408 are angled so that the tips of set bolts 403, 405, 407, and 409 are angled towards top surface 312. The distance E between the set bolts provides rotational stability to hanger 400. In certain embodiments, E=1⅝ ".

Body 401 also includes three threaded holes between the first side 416 and second side 418 shown as threaded hole 421, threaded hole 423, and threaded hole 425, which may each be used to support hanger 400. Holes 421, 423, and 425 are threaded to support commonly used threaded rods, and maybe, for example and without limitation, threaded to accept rods sized ⅜ "-16, ½ "-13, and ⅝ "-11, respectively. Breakaway hanger 400 may be used to support a load from the underside of metal decking 10. Thus, for example, a load may be attached to one or more of threaded holes 421, 423, or 425.

In one embodiment, which is not meant to limit the scope of the invention, hanger 400 sized for a PLW3 or a W3 FORMLOK™ (VERCO DECKING, INC., Phoenix, AZ) metal decking has overall dimensions of: a length, L1, of 5 7/32; a width, W1, of 2¼ ", and a height, H1, of 2". The length, T1, of top surface 312 is approximately 4.5" and top sides 416 and 418 protrude away from the top surface at an approximate angle of 60 degrees. The height from top surface 312 to the centerline of holes 402, 404, 406, and 408 along the top surface of sides 416 and 418, S1, is approximately ⅞ ". The spacing, D1, between holes 402 and 406, and between holes 404 and 408 is 1⅝ ".

Breakaway hanger 400 may be attached to metal decking 10 in a manner similar to that of breakaway hanger 300 by placing the hanger against the metal decking, by advancing the tips of set bolt 403 and set bolt 407 into one of groove 18 or 19, and by advancing the tips of set bolt 405 set bolt 409 into the other of the grooves.

Breakaway hanger 400 is similar to breakaway hanger 300 in disengaging during an excessive load event. Specifically, one or more of set bolt 403, set bolt 405, set bolt 407, and set bolt 409, are chosen to fail, such as by a ductile failure, when a supported load exceeds a value of F*. The selection of set bolts and the operation of the breakaway hanger is discussed subsequently.

Figure 5A:
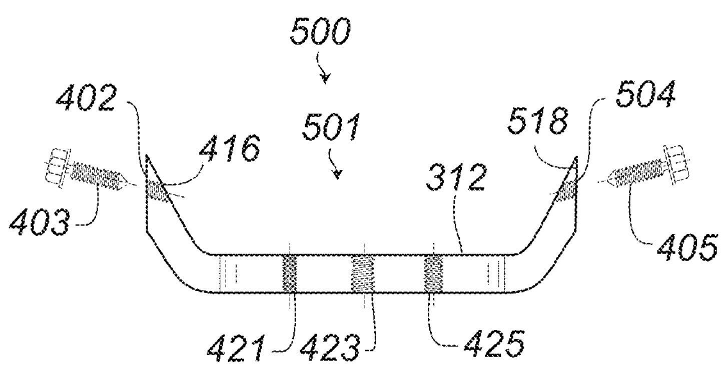
FIGS. 5A, 5B, and 5C are a side view, top view, and bottom view, respectively, of components of a third breakaway hanger embodiment.
Figure 5B:
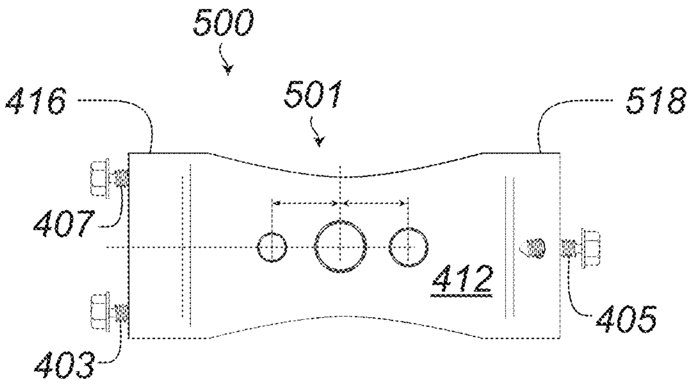
Figure 5C:
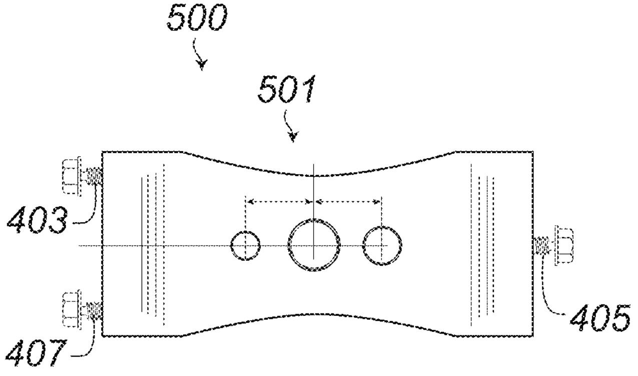

FIGS. 5A, 5B, and 5C are a side view, top view, and bottom view, respectively, of components of a third breakaway hanger embodiment 500, which includes a hanger body 501 and three set bolts shown set bolts 403, 405, and 407. Breakaway hanger 500 is otherwise generally similar to breakaway hanger 400, except as explicitly stated below.

Breakaway hanger 500 differs from breakaway hanger 400 in that it includes a second side 518 that accepts only one set bolt. Specifically, second side 418 has a threaded through hole 504 that accepts set bolt 405, which is angled relative to top surface 412, as discussed above. In certain embodiments, the axis of hole 504 is located midway between the axis of holes 402 and 406.

Breakaway hanger 500 may be attached to metal decking 10 in a manner similar to either breakaway hanger 300 or 400, by placing the hanger against the metal decking, by advancing the tips of set bolt 405 into one of groove 18 or 19, and by advancing the tips of set bolt 403 and set bolt 405 into the other of the grooves.

Breakaway hanger 500 is similar to breakaway hangers 300 and 400 in disengaging during an excessive load event. Specifically, one or more of set bolt 403, set bolt 405, or set bolt 407, is chosen to fail, such as by a ductile failure, when a supported load exceeds a value of F*. The selection of set bolts and the operation of the breakaway hanger is discussed subsequently.

Figure 6:
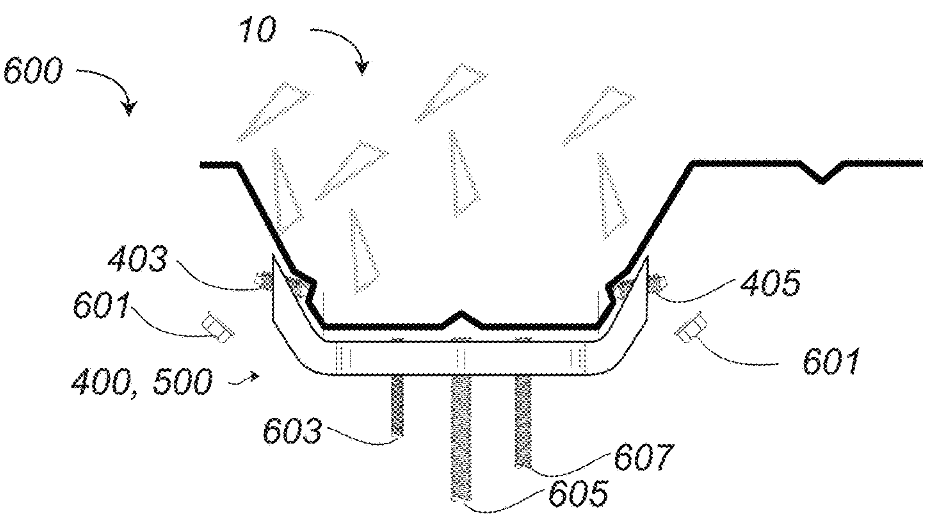
FIG. 6 illustrates one configuration of the second or third breakaway hanger embodiment attached to prior art metal decking.

FIG. 6 illustrates a configuration 600 of the second or third breakaway hanger embodiment attached to prior art metal decking. In configuration 600, a breakaway hanger 400 or 500 is attached to metal decking 10 in a manner similar to the configuration of FIG. 3A. Breakaway hanger 400/500 is placed adjacent to metal decking 10 and set bolts, which have breakaway heads 601, are tightened with their tips in grooves 18/19. A threaded rod 603 is placed within threaded hole 421, a threaded rod 605 is placed within threaded hole 423, and threaded rod 607 is placed within threaded hole 425, and loads, such as hangers or other attachments (not shown) are provided to one or more threaded rods 603, 605, and 607.

Figure 7:
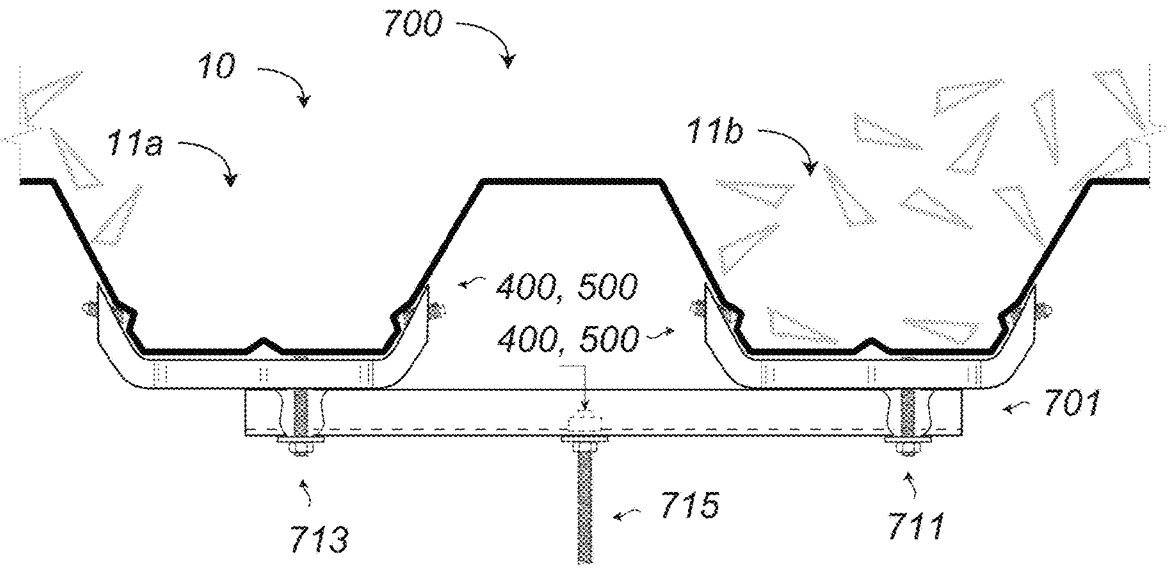
FIG. 7 illustrates another configuration of the second or third breakaway hanger embodiment attached to prior art metal decking.

FIG. 7 illustrates a configuration 700 of the second or third breakaway hanger embodiment attached to prior art metal decking. In configuration 600, a pair of breakaway hangers 400 and/or 500 are attached to different flutes of metal decking 10, with each hanger attached in a manner similar to the configuration of FIG. 6.

Configuration 700 also includes a channel 701 that spans the distance between the pair of hangers. Channel 701 may be, for example and without limitation, manufactured by UNISTRUT® (Unistrut Corp., Harvey, IL), POWER-STRUT® (Atcor International, Harvey, IL), or SUPER-STRUT® (Thomas & Betts, Memphis, TN). See, for example, U.S. Pat. No. 2,345,650, the contents of which are hereby incorporated by reference. Channel 701 has an open side facing downwards and a back side with openings opposite the open side. One side of channel 701 is attached to a first one of breakaway hangers 400/500 by a bolt and washer combination 711 placed through the open face of channel 701 with the washer against the channel and with the threaded end protruding though an opening on the back side and into one of threaded holes 421, 423, and 425. The opposite side of channel 701 is attached to a second one of breakaway hangers 400/500 by a bolt and washer combination 713 placed through the open face of channel 701 with the washer against the channel and with the threaded end protruding though an opening on the back side and into one of threaded holes 421, 423, and 425 of the second breakaway hanger 400/500. Another bolt and washer combination 715 is attached to a midpoint of channel 701 and is used to support a load (not shown), such as load support 2.

Response of Breakaway Hangers to an Excessive Load Event

Figure 8:
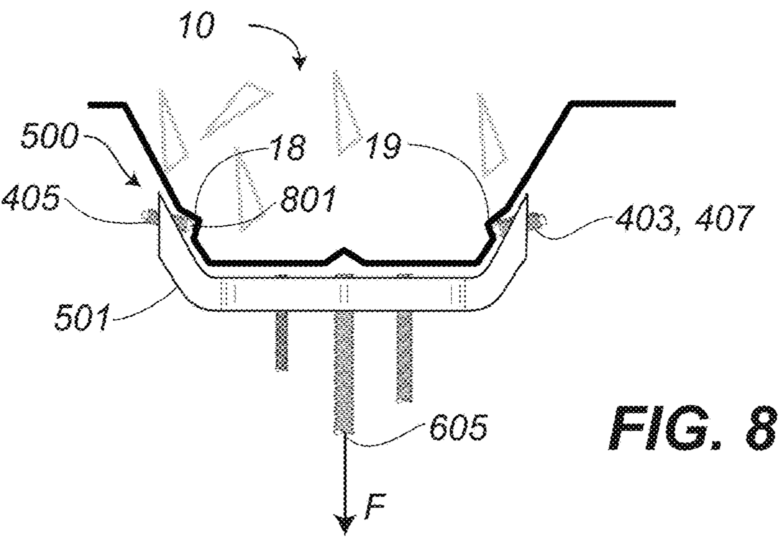
FIG. 8 is a side view of a breakaway hanger supporting a maximum load before an excessive load event.
Figure 9:
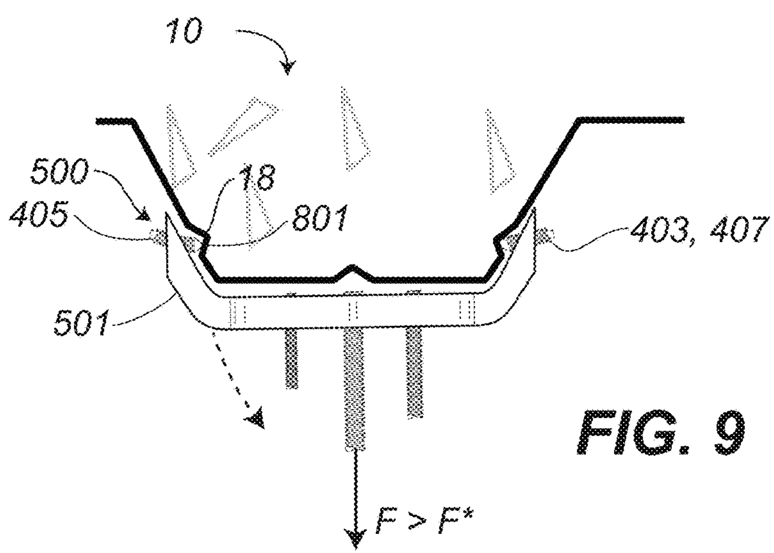
FIG. 9 is a side view of the breakaway hanger during the excessive load event.
Figure 10:
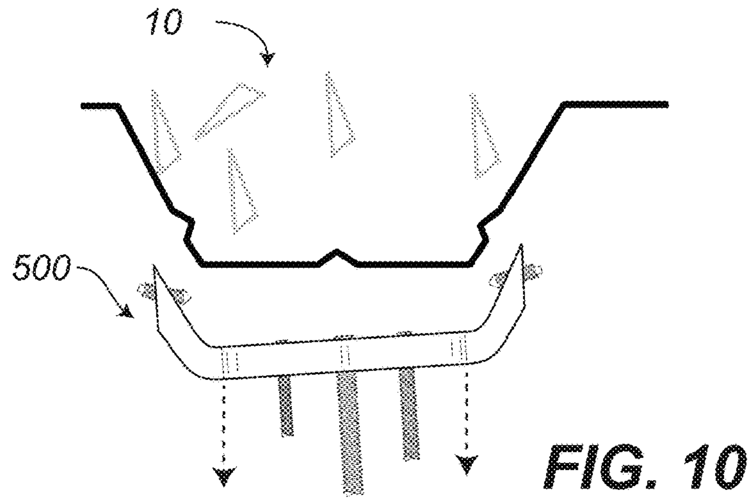
FIG. 10 is a side view of the breakaway hanger after disengagement of the breakaway hanger from metal decking.

The response of breakaway hangers 500 300, 400, and 500 are similar, and are illustrated in FIG. 8 is a side view of breakaway hanger 500 supporting a maximum load before an excessive load event, FIG. 9 is a side view of the breakaway hanger during the excessive load event, and FIG. 10 is a side view of the breakaway hanger after disengagement of the breakaway hanger from metal decking 10.

The embodiment of breakaway hanger 500 in FIGS. 8-10 includes, illustratively, one set bolt (set bolt 405) that will fail during an excessive load event and two set bolts (set bolt 403 and set bolt 407) that will not fail during the excessive load event. As noted above, the breakaway hangers each include at least one set bolt that fails during an excessive load event and may include other set bolts that do not fail.

As shown in FIG. 8, prior to the excessive load event, breakaway hanger 500 is attached to metal decking 10 with the tips of set bolt 403, set bolt 405, and set bolt 407 advanced into grooves 18 and 19 of the metal decking, and is supporting a load, F.

The hanger of FIG. 8 is designed to support a maximum design load of F* from metal decking 10, and to disengage from the metal decking if the load during an excessive load event exceeds F*. Specifically, set bolt 405, having a tip 801, are chosen to exhibit ductile failure when the hanger supports a force of F*, and set bolt 403 and set bolt 407 are designed to not fail.

During an excessive load event, as shown in FIG. 9, the load, F, increases to a value greater than F*. By design, the downward force on set bolt 405 causes the set bolt to deform and eventually undergo ductile failure. Thus, for example, the force on hanger body 501 causes tip 801, which is in groove 18, to bend upwards, and for the hanger body to rotates as illustrated by the dashed line.

Set bolt 405 continues to bend until the end of the bolt is no longer in groove 18, and as shown in FIG. 10, breakaway hanger 500 disengages with metal decking 10, and the hanger falls from the metal decking as illustrated by the dashed line, without causing damage to the metal decking.

Set Bolt Selection

In various embodiments, one or more of the set bolts of the inventive breakaway hangers is designed to undergo ductile failure when the hanger supports a load of F*, while the other set bolts are designed to not fail when the hanger supports a load of F*. Thus, for example and without limitation, one or more of set bolts 304 and 305 of breakaway hanger 300, or one or more of set bolts 403, 405, 407, and 409 of breakaway hangers 400 or 500 are designed to undergo ductile failure before the metal decking is damaged. In various embodiments a breakaway hanger includes: one set bolt designed for ductile failure, two or more set bolts designed for ductile failure, or all of the set bolts designed for ductile failure.

The ductile failure of a set bolt, is determined, in part, by the shape of metal decking 10, the shape of the hanger body, such as, for example and without limitation hanger body 301, 401, or 501, and the shape, material, and torque of the set bolts, such as, for example and without limitation, set bolts 304, 305, 403, 405, 407, and 409, and the number of bolts which will not undergo ductile failure.

The selection of set bolts for a specific breakaway hanger and number of set bolts designed to undergo ductile failure is achieved by trial and error. Thus, for example, a maximum load, F*, is set for a specific metal decking 10, a breakaway hanger having one or more set bolts designed for failure is attached to the metal decking, and an increasing load is applied to the hanger. If the hanger is able to support a load of F*, then, for example, the set bolt that was meant to fail is replaced with a set bolt that is more prone to ductile failure. If the hanger disengages by the failure of a set bolt before a support load of F* is achieved, then a set bolt that is less prone to ductile failure is provided.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

I claim:

1. A hanger for attaching to an underside of a metal decking for supporting a load less than a predetermined load F*, where the metal decking includes a bottom flange having a width, a first web extending away from the bottom flange having a first groove, and a second web extending away from the bottom flange and having a second groove, where the first groove and the second groove are parallel with a spacing of WG and with a distance H from the bottom flange, said hanger comprising:

- a body including a first end, a second end, and a central portion between the first end to the second end, where said central portion includes a top surface having a length defining a top plane and a bottom surface, where the first end and the second end extend away from the top plane, where the first end includes a first threaded hole at an angle θ relative to the top surface, and where the second end includes a second threaded hole at the angle θ relative to the top surface;
- a first set bolt threadably engaged with the first threaded hole such that the first set bolt forms the angle θ relative to the top surface with a tip of the first set bolt pointing towards the top surface; and
- a second set bolt threadably engaged with the second threaded hole such that the second set bolt forms the angle θ relative to the top surface with a tip of the second set bolt pointing towards the top surface,
- such that the hanger is attachable to the metal decking with the top surface placed adjacent to the bottom flange with the first end adjacent to the first web and the second end adjacent to the second end, with the tip of the first set bolt contacting the first groove and with the tip of the second set bolt contacting the second groove, and
- such that when the hanger is attached to the metal decking, the hanger disengages from the metal decking when the load supported by the hanger increases above the predetermined load F*.

2. The hanger of claim 1, where when the load supported by the hanger increases above the predetermined load F*, at least one of the first set bolt, the second set bolt, or any combination thereof undergoes ductile failure.

3. The hanger of claim 1, where the central portion includes a bottom surface, and where a load support is attached to the bottom surface.

4. The hanger of claim 1, where the first threaded hole has a first axis, where the second threaded hole has a second axis, and where the first axis and the second axis are coplanar.

5. The hanger of claim 1, said second end further comprising a third threaded hole at the angle θ relative to the top surface, said hanger further comprising a third set bolt threadably engaged with the third threaded hole,

- such that the hanger is attachable to the metal decking when the tip of the third set bolt contacts the first groove.

6. The hanger of claim 5, where when the load supported by the hanger increases above the predetermined load F*, at least one of the first set bolt, the second set bolt, the third set bolt, or any combination thereof undergoes ductile failure.

7. The hanger of claim 5, where the first threaded hole has a first axis, where the third threaded hole has a third axis, where the first axis and the third axis are coplanar in a first plane.

8. The hanger of claim 7, where the second threaded hole has a second axis, and where the second axis intersects the first plane at a location between the first axis and the third axis.

9. The hanger of claim 5, said second end further comprising a fourth threaded hole at an angle, θ, relative to the top surface, said hanger further comprising a fourth set bolt threadably engaged with the fourth threaded hole,

- such that the hanger is attachable to the metal decking when the tip of the fourth set bolt contacts the second groove.

10. The hanger of claim 9, where when the load supported by the hanger increases above the predetermined load F*, at least one of the first set bolt, the second set bolt, the third set bolt, the fourth set bolt, or any combination thereof undergoes ductile failure.

11. The hanger of claim 9, where the second threaded hole has a second axis, where the fourth threaded hole has a fourth axis, where the second axis and the fourth axis are coplanar in a second plane.

12. A method of attaching a hanger to an underside of a metal decking and supporting a load than a predetermined load F*, where the metal decking includes a bottom flange having a width, a first web extending away from the bottom flange having a first groove, and a second web extending away from the bottom flange and having a second groove, where the first groove and the second groove are parallel with a spacing of and with a distance H from the bottom flange, and where the hanger includes a body including a first end, a second end, and a central portion between the first end to the second end, where said central portion includes a top surface having a length defining a top plane and a bottom surface, where the first end and the second end extend away from the top plane, where the first end includes a first threaded hole at an angle θ relative to the top surface, and where the second end includes a second threaded hole at the angle θ relative to the top surface, a first set bolt threadably engaged with the first threaded hole such that the first set bolt forms the angle θ relative to the top surface with a tip of the first set bolt pointing towards the top surface, and a second set bolt threadably engaged with the second threaded hole such that the second set bolt forms the angle θ relative to the top surface with a tip of the second set bolt pointing towards the top surface, where said method comprising:

positioning the body adjacent to the metal decking with the top surface adjacent to the bottom flange, with the first threaded hole adjacent to the first groove, and with the second threaded hole adjacent to the second groove;

advancing an end of the first set bolt through the first threaded hole to contact the first groove; and advancing an end of the second set bolt through the second threaded hole to contact the first groove, such that the hanger disengages from the metal decking when the load supported by the hanger increases above the predetermined load F*.

13. The method of claim 12, where when the load supported by the hanger increases above the predetermined load F*, at least one of the first set bolt, the second set bolt, or any combination thereof undergoes ductile failure.

14. The method of claim 12, where the central portion includes a bottom surface, said method further comprising attaching a load to the bottom surface.

15. The method of claim 12, where the first threaded hole has a first axis, where the second threaded hole has a second axis, and where the first axis and the second axis are coplanar.

16. The method of claim 12, said first end further comprising a third threaded hole at the angle θ relative to the top surface, said hanger further comprising a third set bolt threadably engaged with the third threaded hole, said method further comprising:

advancing an end of the third set bolt through the third threaded hole to contact the second groove.

17. The method of claim 16, where when the load supported by the hanger increases above the predetermined load F*, at least one of the first set bolt, the second set bolt, the third set bolt, or any combination thereof undergoes ductile failure.

18. The method of claim 16, said second end further comprising a fourth threaded hole at an angle, q, relative to the top surface, said hanger further comprising a fourth set bolt threadably engaged with the fourth threaded hole, said method further comprising:

advancing an end of the fourth set bolt through the fourth threaded hole to contact the second groove.

19. The method of claim 18, where when the load supported by the hanger increases above the predetermined load F*, at least one of the first set bolt, the second set bolt, the third set bolt, the fourth set bolt, or any combination thereof undergoes ductile failure.

* * * * *